(12) United States Patent
Li

(10) Patent No.: US 11,374,642 B2
(45) Date of Patent: Jun. 28, 2022

(54) METHOD FOR ENABLING ANALOG PRECODING AND ANALOG COMBINING

(71) Applicant: MITSUBISHI ELECTRIC CORPORATION, Tokyo (JP)

(72) Inventor: Qianrui Li, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/298,495

(22) PCT Filed: Jan. 16, 2020

(86) PCT No.: PCT/JP2020/002198
§ 371 (c)(1),
(2) Date: May 28, 2021

(87) PCT Pub. No.: WO2020/149422
PCT Pub. Date: Jul. 23, 2020

(65) Prior Publication Data
US 2022/0052745 A1  Feb. 17, 2022

(30) Foreign Application Priority Data

Jan. 17, 2019 (EP) .................................. 19305056

(51) Int. Cl.
*H04L 5/12* (2006.01)
*H04B 7/06* (2006.01)
(Continued)

(52) U.S. Cl.
CPC ......... *H04B 7/0695* (2013.01); *H04B 7/0456* (2013.01); *H04B 7/0639* (2013.01); *H04B 7/088* (2013.01); *H04B 7/0452* (2013.01)

(58) Field of Classification Search
CPC .. H04B 7/0695; H04B 7/0456; H04B 7/0639; H04B 7/088; H04B 7/0452
(Continued)

(56) References Cited

U.S. PATENT DOCUMENTS 10,218,478 B2 * 2/2019 Kim .................... H04L 5/0048
10,707,974 B1 * 7/2020 Ho ......................... H04B 17/21
(Continued)

OTHER PUBLICATIONS

Cristian et al (Low Complexity Hybrid precoding strategies for Millimeter Wave communication system, IEEE Transactions on wireless communications vol. 15, No. 12. Dec. 2016, pp. 8380-8393).*
(Continued)

*Primary Examiner* — Helene E Tayong
(74) *Attorney, Agent, or Firm* — Birch, Stewart, Kolasch & Birch, LLP

(57) ABSTRACT

The invention comprising: jointly determining an analog precoding matrix $F_{RF}$ and a plurality of multi-user groups $G_l$, each multi-user group $G_l$ being associated to a respective subcarrier l, each multi-user group $G_l$ containing a plurality of receivers to be jointly served for a data transmission on the respective subcarrier l; and using the analog precoding matrix $F_{RF}$ for processing at least one signal to transmit; characterized in that the joint determination comprises: /a/ optimizing a beamforming function $f(F_{RF}, G_1 \ldots, G_L)$ with respect to the analog precoding matrix $F_{RF}$, the multi-user groups $G_l$ being fixed; /b/ optimizing a scheduling function $g(G_l, F_{RF})$ with respect to the multi-user groups $G_l$, a value of the analog precoding matrix $F_{RF}$ being fixed; wherein /a/ and /b/ are iteratively repeated.

13 Claims, 6 Drawing Sheets

(51) Int. Cl.
*H04B 7/0456* (2017.01)
*H04B 7/08* (2006.01)
*H04B 7/0452* (2017.01)

(58) Field of Classification Search
USPC .......................................................... 375/262
See application file for complete search history.

(56) References Cited

U.S. PATENT DOCUMENTS

| | | |
|---|---|---|
| 2012/0170442 A1 | 7/2012 | Razaviyayn et al. |
| 2013/0188751 A1 | 7/2013 | Ohlmer et al. |
| 2014/0328266 A1* | 11/2014 | Yu .......................... H04L 5/0053 370/329 |
| 2016/0080051 A1* | 3/2016 | Sajadieh .............. H04B 7/0456 375/267 |
| 2016/0192297 A1* | 6/2016 | Kim ..................... H04B 7/0665 455/522 |
| 2016/0359533 A1* | 12/2016 | Obara .................. H04B 7/0848 |
| 2017/0033853 A1* | 2/2017 | Kim ..................... H04B 7/0617 |
| 2017/0175022 A1* | 6/2017 | Hux ..................... C10M 111/00 |
| 2017/0230095 A1 | 8/2017 | Kim et al. |
| 2017/0338873 A1 | 11/2017 | Yue et al. |
| 2018/0062715 A1* | 3/2018 | Li ......................... H04B 7/0632 |
| 2019/0199410 A1* | 6/2019 | Zhao .................... H04B 7/0695 |
| 2021/0028832 A1* | 1/2021 | Liu ....................... H04B 7/0608 |

OTHER PUBLICATIONS

International Search Report for PCT/JP2020/002198 (PCT/ISA/210) dated Mar. 24, 2020.
Written Opinion of the International Searching Authority for PCT/JP2020/002198 (PCT/ISA/237) dated Mar. 24, 2020.

* cited by examiner

METHOD FOR ENABLING ANALOG PRECODING AND ANALOG COMBINING

TECHNICAL FIELD

The present invention relates to wireless communication and more specifically to techniques for radio resource management in a multi-user (MU) wideband millimeter wave (mmWave) system, for instance a wideband MU mmWave massive Multiple-Input/Multiple-Output (MIMO) system.

BACKGROUND ART

Millimeter wave (mmWave) wireless communication, which makes use of carrier frequencies going from 30 gigahertz (GHz) to 300 GHz, is expected to be a key feature, for instance, for future 5G cellular systems. A major benefit of using such high frequencies is the availability of much greater spectrum for higher data rates.

Millimeter wave propagation is especially characterized by high path loss in free space, high penetration loss through building materials, weak diffraction, and vulnerability to blockage. Therefore, highly directional adaptive antenna arrays at both transmission and reception sides have to be used for compensating propagation impairments and enabling cellular coverage over distances of few hundred meters.

Directional arrays are usually constructed using a very large number of antenna elements, for instance tens to several hundreds. In addition to high directional gain, the use of large antenna arrays enhances spatial multiplexing since narrower beams can be realized.

The radio resource management in a wideband mmWave system is actually much more complicated than in a conventional system below 6 GHz. In the case of systems with large antenna arrays, since the high bandwidth mixed-signal components are expensive and consume lots of power, the number of Radio Frequency (RF) chains at the transceiver needs to be smaller than the number of antennas. In order to reduce the number of RF chains, hybrid analog/digital beamforming architectures are generally used.

One of the advantages of hybrid architectures is that the additional digital processing can compensate the lack of precision (due, for instance, to phase shifters that only work with a finite phase resolution) of analog processing. However, in the case of a wideband mmWave system, since the analog RF (or simply "RF") beamforming of the wideband system is shared among all subcarriers while the digital base band (or simply "base band") beamforming can be different between subcarriers, the beamforming design (i.e. the design of analog and digital beamformers) for the radio resource management is much more complicate than in a narrow band mmWave system or a conventional LTE system operating below 6 GHz.

In addition, in a Multi-User (MU) system, a plurality of User Equipments (UE, also referred to as "users", or "receivers" hereinafter) can be assigned to a same set of Resource Blocks (RB) for data transmission. Thus, the radio resource management must take into account both the problems of:

User grouping to group UEs for MU scheduling; and
Resource allocation to assign time and frequency resources to the groups of UEs.

The principle of user scheduling, resource allocation and user grouping to the groups of UEs is represented in FIG. 1.

FIG. 1 represents a cell 101 served by a Base Station (BS) 103 (also referred to hereinafter as "transmitter"), comprising a plurality of active UEs 102a, 102b, 102c, 102d. First, a plurality 104 of active UEs among the active UEs 102a, 102b, 102c, 102d may be selected for transmission. The selected UEs (also called scheduled UEs) are circled in FIG. 1. In the case of a wideband system, each scheduled UE may then be assigned to a certain frequency band for transmission during a resource allocation procedure. In the case of a multi-user transmission scheme, a plurality of users can be jointly served in a same time-frequency resource (i.e. a set of Resource Blocks, RBs). To that purpose, a user grouping is performed to form multi-user groups 105a, 105b of UEs such that the UEs of a MU group occupy the same time-frequency resource 106a, 106b. For instance, in a wideband system with L subcarriers, it may be assumed that, for each subcarrier $l=1 \ldots L$, K users (with $K \geq 1$ being an integer) are jointly served on the l-th subcarrier. In that case, each MU group $\mathcal{G}_l$ (with $l=1 \ldots L$) may contain the K users that are jointly served on the l-th subcarrier.

FIGS. 2a and 2b represent examples of a transmitter and a receiver, respectively, in a hybrid wideband wireless system.

According to FIG. 2a, the transmitter 200 is equipped with $N_t$ transmitting antennas and $L_t$ transmitting RF chains. It operates on a wideband system with L subcarriers, and it is assumed that on each subcarrier l (with $l=1, \ldots, L$), K users are jointly scheduled and served by the transmitter 200. In the following, the indices of the scheduled users on a given subcarrier l are noted $\pi(l,k)$ (with $l=1, \ldots, L$ and $k=1, \ldots, K$). In other words, the user $\pi(l,k)$ is the k-th user on the l-th subcarrier.

At the transmitter 200, for each subcarrier l (with $l=1, \ldots, L$), $N_S(l)$ data streams $I_1, \ldots, I_{N_S(l)}$ are processed by a base band precoder 201, 202 (or "base band precoding matrix") $F_{BB}[l]$ followed by an RF precoder 203 (or "RF precoding matrix") $F_{RF}$. It has to be noted that the digital base band precoders 201, 202 may be different among different subcarriers, while the analog RF precoder 203 is the same for all subcarriers.

According to the embodiment represented in FIG. 2b, the $\pi(l,k)$-th receiver 210 $\pi(l,k)$ (with $1 \leq k \leq K$ and $1 \leq l \leq L$) may be equipped with $N_{r_{\pi(l,k)}}$ receiving and $L_{r_{\pi(l,k)}}$ receiving RF chains. The $\pi(l,k)$-th receiver 210 may receive $$N_{S_{\pi(l,k)}}$$

data streams from the transmitter. The received data streams may be processed by a RF combiner 211

$$W_{RF,\pi(l,k)} \in \mathbb{C}^{N_{r_{\pi(l,k)}} \times L_{r_{\pi(l,k)}}},$$

followed by a base band combiner 212

$$W_{BB,\pi(l,k)}[l] \in \mathbb{C}^{L_{r_{\pi(l,k)}} \times N_{S_{\pi(l,k)}}}.$$

After processing by the RF and base band combiners, the $\pi(l,k)$-th receiver 210 may output $N_{S_{\pi(l,k)}}$ data streams $O_1, O_2, \ldots,$ $$O_{N_{S_{\pi(l,k)}}}.$$

As represented in FIG. 2b, there may be more than one base band combiner for the π(l,k)-th receiver. Indeed, the scheduled user π(l,k) on the l-th subcarrier might also be scheduled on other subcarriers $l_2, \ldots, l_i$.

Of course, the architecture represented in FIGS. 2a and 2b is only an example of a hybrid wideband wireless system in which the present method may be performed. Other systems may be considered. For instance, at receivers, there may be only analog combiners instead of both analog and digital combiners.

The global performance of such hybrid wideband wireless system may be quantified by a value, called "figure of merit", and it may be found that the figure of merit is function of the MU groups $\mathcal{G}_{l|l=1}^{L} = \{\mathcal{G}_l; l=1\ldots L\}$ and of the RF beamforming matrices, i.e. the RF precoding matrix $F_{RF}$ and the RF combining matrices $W_{RF,\pi(l,k)}$.

As an example, the case where the figure of merit for the radio resource management is the average wideband sum rate of the downlink (DL) transmission according to a possible embodiment is provided below.

In this embodiment, it is assumed that K receivers are jointly served for multi-user transmission on each subcarrier. In other embodiments, the number of receivers jointly served may be different for two distinct subcarriers. In the case where K receivers (with K≥2) are jointly served on each subcarrier l (with l=1, ..., L), the total number of streams transmitted by the transmitter on subcarrier l is equal to $N_s^{tot} = \sum_{k=1}^{K} N_{s_{\pi(l,k)}}$. In that case, $$F_{BB}[l] \in \mathbb{C}^{L_t \times N_s^{tot}}$$

and $F_{RF} \in \mathbb{C}^{N_t \times L_t}$.

Furthermore, the following constraints may be assumed:

$$N_t \geq L_t \geq N_s^{tot} \text{ and } N_{r_{\pi(l,k)}} \geq L_{r_{\pi(l,k)}} \geq N_{s_{\pi(l,k)}} \text{ and } L_t = \sum_{k=1}^{K} L_{r_{\pi(l,k)}}$$

The signal $$\hat{s}_{\pi(l,k)}[l] \in \mathbb{C}^{N_{s_{\pi(l,k)}} \times 1}$$

received at the receiver π(l,k), i.e. the k-th receiver (where k is an integer, with 1≤k≤K) on the l-th subcarrier (with 1≤l≤L), may be written:

$$\hat{s}_{\pi(l,k)}[l] = W_{BB,\pi(l,k)}^H[l] W_{RF,\pi(l,k)}^H H_{\pi(l,k)}[l] F_{RF} F_{BB}[l] s[l] + W_{BB,\pi(l,k)}^H[l] W_{RF,\pi(l,k)}^H n_{\pi(l,k)}[l]$$

where $M^H$ denotes the conjugate transpose matrix of a matrix M, $$H_{\pi(l,k)}(l) \in \mathbb{C}^{N_{r_{\pi(l,k)}} \times N_t}$$

is the user channel matrix for the k-th receiver on the l-th subcarrier, $s[l] = [s_{\pi(l,1)}^H[l] \ldots s_{\pi(l,1)}^H[l]]^H$ is the concatenation of the data symbols $$s_{\pi(l,k)}[l] \in \mathbb{C}^{N_{s_{\pi(l,k)}} \times 1}$$

for all the K receivers scheduled on the l-th subcarrier, and $n_{\pi(l,k)}[l]$ is the noise vector for the π(l,k)-th receiver.

In case the user channel matrix (or "channel state information", CSI) $H_{\pi(l,k)}(l)$ is not perfectly known at the receiver, a channel estimation may be performed in order to estimate the CSI at the Receiver (CSIR). Any method of the state of the art for estimating the CSIR may be performed. In this disclosure, $H_{\pi(l,k)}(l)$ may denote the perfect CSIR if it is known, or it may denote an estimation of CSIR obtained by a dedicated method.

It may be assumed that the power of data symbol vector satisfies $\mathbb{E}[s[l](s[l])^H] = I_{N_s^{tot}}$, where $\mathbb{E}$ denotes the statistical expectation and $I_{sz}$ denotes the identity matrix of size sz, and that $n_{\pi(l,k)}[l]$ is a Gaussian vector. For instance, $$n_{\pi(l,k)}[l] \sim \mathcal{N}_\mathbb{C}\left(0, \sigma^2 I_{N_{r_{\pi(l,k)}}}\right),$$

where $\sigma^2 > 0$. It may also be assumed that the RF and base band precoders are subjected to the following power constraint: $\|F_{RF} F_{BB}[l]\|_F^2 = P_{tot}[l]$, where $P_{tot}[l]$ is the total transmitting power on the l-th subcarrier and $\|M\|_F$ is a norm of a matrix M, for instance the Frobenius norm.

The RF precoder/combiners of the hybrid architecture may be implemented by phase shifters, each transceiver being connected to each antenna through a network of phase shifters. In this case, the elements of matrices $F_{RF}$ and $W_{RF\pi(l,k)}$ may satisfy:

$$[F_{RF}]_{m,n} = \frac{1}{\sqrt{N_t}} e^{j\theta_{m,n}}$$

$$[W_{RF,\pi(l,k)}]_{m,n} = \frac{1}{\sqrt{N_r}} e^{j\varphi_{m,n}^{(\pi(l,k))}} \text{ for all } k = 1, \ldots, K \text{ and}$$

$$l = 1, \ldots, L$$

$$\theta_{m,n} \in \Phi_{prec}, \phi_{m,n}^{(\pi(l,k))} \in \Phi_{comb}^{(\pi(l,k))} \text{ for all } k = 1, \ldots, K$$

where $\Phi_{prec}$ is the discrete set of the quantization phase for the phase shifters at transmitter and $\Phi_{comb}^{(\pi(l,k))}$ is the discrete set of the quantization phase for the phase shifters at receiver π(l,k).

In one embodiment, minimum mean square error (MMSE) base band digital beamforming may be used at the receiver π(l,k). The base band precoder $F_{BB}[l]$ may be written as a concatenation of K sub-matrices $F_{BB,\pi(l,k)}[l]$ with k=1, ..., K:

$$F_{BB}[l] = [F_{BB,\pi(l,1)}[l] \ldots F_{BB,\pi(l,k)}[l]]$$

where $F_{BB,\pi(l,k)}[l]$ is the part of matrix $F_{BB}[l]$ that is used for precoding signals to be transmitted to the receiver π(l,k). The digital base band combiner may thus be written:

$$W_{BB,\pi(l,k)}[l] = (\sigma^2 W_{RF,\pi(l,k)}^H W_{RF,\pi(l,k)} + H_{\pi(l,k)}^{eq}[l] F_{BB}[l] F_{BB}^H[l] (H_{\pi(l,k)}^{eq}[l])^H)^{-1}$$

$$H_{\pi(l,k)}^{eq}[l] F_{BB,\pi(l,k)}[l]$$

where $H_{\pi(l,k)}^{eq}[l] = W_{RF,\pi(l,k)}^H H_{\pi(l,k)}[l] F_{RF}$ is the equivalent channel of the receiver π(l,k).

The average wideband sum rate of the downlink (DL) transmission is:

$$SR = \frac{1}{L}\sum_{l=1}^{L}\sum_{k=1}^{K} R_{\pi(l,k)}[l]$$

$$SR = \frac{1}{L}\sum_{l=1}^{L}\sum_{k=1}^{K} \log|I + F_{BB,\pi(l,k)}^{H}[l](H_{\pi(l,k)}^{eq}[l])^{H} R_{\pi(l,k)}^{-1}[l] H_{\pi(l,k)}^{eq}[l] F_{BB,\pi(l,k)}[l]|$$

where $R_{\pi(l,k)}$ is the effective noise covariance matrix for scheduled receiver $\pi(l,k)$, given by:

$$R_{\pi(l,k)} = \sum_{\substack{i \neq \pi(l,k) \\ i \in \mathcal{G}_l}} H_{\pi(l,k)}^{eq}[l] F_{BB,i}[l] F_{BB,i}^{H}[l] (H_{\pi(l,k)}^{eq}[l])^{H} + \sigma^2 W_{RF,\pi(l,k)}^{H} W_{RF,\pi(l,k)}$$

where $\mathcal{G}_l = \{\pi(l,k); k=1, \ldots, K\}$ is the MU group containing the K users jointly served on the l-th subcarrier.

Jointly optimize a function of $\mathcal{G}_l|_{l=1}^{L}$, $F_{RF}$ and $W_{RF\pi(l,k)}$ in order to maximize the global performance of the system is a difficult non convex hybrid optimization problem, in the sense that it is a joint optimization of several parameters, in which some parameters are optimized in the continuous domain while other parameters are in discrete codebook space. For that reason, it is difficult to find a closed form solution or even a sub-optimal numerical solution in a reasonable time. In addition, solving such problem requires gathering channel state information (CSI) for all users on all subcarriers at the transmitter, leading to huge signaling overhead, which is not admissible for a real system design.

In algorithms of the prior art, the user scheduling, i.e. the determination of the MU groups $\mathcal{G}_1, \ldots, \mathcal{G}_L$, and the RF beamforming design, i.e. the determination of the RF beamforming matrices $F_{RF}$, $W_{RF,\pi(l,k)}$, are processed sequentially and independently of each other. More specifically, these algorithms first determine the user groups $\mathcal{G}_1, \ldots, \mathcal{G}_L$ based on a predefined scheduling criterion, and then determine the RF beamforming matrices $F_{RF}$, $W_{RF,\pi(l,k)}$ based on a predefined RF beamforming criterion. However, such sequential processing of both user scheduling and RF beamforming problems leads to performance degradations.

There is thus a need for methods for user scheduling and RF beamforming design in a wideband multi-user massive MIMO system with good performances while avoiding high computational complexity and huge signaling overhead.

SUMMARY OF INVENTION

The invention relates to a beamforming method implemented by a computer for enabling analog precoding in a millimeter wave communication system comprising a transmitter being able to serve a plurality of receivers over a plurality of subcarriers, the method comprising:
jointly determining an analog precoding matrix $F_{RF}$ and a plurality of multi-user groups $\mathcal{G}_l$, each multi-user group $\mathcal{G}_l$ being associated to a respective subcarrier l among the plurality of subcarriers, each multi-user group $\mathcal{G}_l$ containing a plurality of receivers among the plurality of receivers to be jointly served for a data transmission on the respective subcarrier l; and
using the analog precoding matrix $F_{RF}$ for processing at least one signal to transmit to at least one receiver among the plurality of receivers on a subcarrier among the plurality of subcarriers;

characterized in that the joint determination of the analog precoding matrix $F_{RF}$ and the plurality of multi-user groups $\mathcal{G}_l$ comprises:
/a/ optimizing a beamforming function $f(F_{RF}, \mathcal{G}_1, \ldots, \mathcal{G}_L)$ of the analog precoding matrix $F_{RF}$ and the multi-user groups $\mathcal{G}_l$ with respect to the analog precoding matrix $F_{RF}$, the multi-user groups $\mathcal{G}_l$ being fixed;
/b/ optimizing a scheduling function $g(\mathcal{G}_l, F_{RF})$ of the analog precoding matrix $F_{RF}$ and the multi-user groups $\mathcal{G}_l$ with respect to the multi-user groups $\mathcal{G}_l$, a value of the analog precoding matrix $F_{RF}$ being fixed;
wherein /a/ and /b/ are iteratively repeated until a stopping criterion is met.

As mentioned above, millimeter wave systems are submitted to additional constraints with respect to the conventional communication systems (such as the RF precoding and combining codebooks, non-frequency selective property of the RF precoder and combiner, etc.). Therefore, for these mmWave systems, the precoder and scheduling design have to take into account these specific constraints, and the design is very different from conventional sub-6 GHz systems. The present invention proposes to solve the problem of beamforming design under these specific constraints, with a multistage method based on a joint alternate optimization of the scheduling problem (step /b/ of the method) and RF beamforming (step /a/ of the method).

In an embodiment, /b/ may be performed after /a/. In /a/ the multi-user groups $\mathcal{G}_l$ may be obtained in a previous iteration of the joint determination, and in /b/ the value of the analog precoding matrix $F_{RF}$ may be obtained in a current iteration of /a/.

It is meant by "previous" and "current" iteration two successive iterations of the method, the "previous" iteration designating the iteration just preceding the "current" iteration.

In an alternative embodiment, /b/ may be performed before /a/. In /a/ the multi-user groups $\mathcal{G}_l$ may be obtained in a current iteration of /b/, and in /b/ the value of the analog precoding matrix $F_{RF}$ may be obtained in a previous iteration of the joint determination.

In one or several embodiments, the analog precoding may be performed by using a set $\mathcal{C}_{prec}$ of analog precoding codewords, and /a/ may comprise:
determining a first matrix $F^*_{RF}$ that optimizes the beamforming function $f(F_{RF}, \mathcal{G}_1, \ldots, \mathcal{G}_L)$ without supposing that columns of the first matrix $F^*_{RF}$ belong to the set $\mathcal{C}_{prec}$ of analog precoding codewords;
determining at least one analog precoding codewords, each determined analog precoding codeword minimizing a distance to a column of the first matrix $F^*_{RF}$;
determining the analog precoding matrix $F_{RF}$ whose columns are equal to the determined at least one analog precoding codewords.

In addition the method may further comprise: determining at least one analog combining matrix $W_{RF\pi(l,k)}$;
wherein the beamforming function and the scheduling function may be further function of the at least one analog combining matrix $W_{RF,\pi(l,k)}$; wherein the optimization in /a/ may be a joint optimization of the beamforming function with respect to the analog precoding matrix $F_{RF}$ and the at least one analog combining matrix $W_{RF,\pi(l,k)}$;
wherein the optimization in /b/ may be performed with a value of an analog combining matrix among the at least one analog combining matrix $W_{RF,\pi(l,k)}$ being fixed;
wherein at least one determined analog combining matrix $W_{RF,\pi(l,k)}$ may be further used for processing at least one signal to transmit to at least one receiver among the plurality of receivers on a subcarrier among the plurality of subcarriers.

Furthermore, the analog combining may be performed by using a set $\mathcal{C}_{comb,\pi(l,k)}$ of analog combining codewords, wherein /a/ comprises:

determining a second matrix $W^*_{RF,\pi(l,k)}$ that optimizes the beamforming function without supposing that columns of the second matrix $W^*_{RF,\pi(l,k)}$ belong to the set $\mathcal{C}_{comb,\pi(l,k)}$ of analog combining codewords;

determining at least one analog combining codewords, each determined analog combining codeword minimizing a distance to a column of the second matrix $W^*_{RF,\pi(l,k)}$;

determining an analog combining matrix $W_{RF,\pi(l,k)}$ whose columns are equal to the determined at least one analog combining codewords.

In one or several embodiments, the method may further comprise:

receiving a plurality of transmitting matrices $A_{T,\pi(l,k)}^{[l]}$, each transmitting matrix among the plurality of receiving matrices being associated to a receiver π(l,k) among the plurality of receivers and to a subcarrier l among the plurality of subcarriers, wherein columns of each receiving matrix among the plurality of receiving matrices belong to the set $\mathcal{S}_{prec}$ of analog precoding codewords;

determining, based on the plurality of transmitting matrices $A_{T,\pi(l,k)}^{[l]}$, a plurality of receiver sets $\mathcal{S}_i$, each receiver set $\mathcal{S}_i$ comprising one or more receiver among the plurality of receivers, each receiver among the one or more receiver being associated to a subcarrier among the plurality of subcarriers; and /a/ may further comprise:

determining a plurality of analog precoding submatrices $F_{RF,k}$, each analog precoding submatrix $F_{RF,k}$ corresponding to a part a the analog precoding matrix $F_{RF}$ associated to receivers of a respective receiver set $\mathcal{S}_k$.

The determination of receiver sets (also called "clustering procedure") provides a better compromise complexity-performance. With this clustering procedure, solving the optimization of $F_{RF}$ and $W_{RF,\pi(l,k)}$ is transformed into solving K parallelizable optimization of $F_{RF,k}$ and $W_{RF,\pi(l,k)}$, each problem having smaller problem dimension and reduced search space, while the sum rate performance degradation due to clustering is negligible.

It has to be understood that this clustering procedure is optional. However, in case such clustering is not performed, the search space (for scheduling design) for the centralized design at the BS is larger and the complexity (for RF precoder/combiner optimization) is increased due to the problem dimension.

In an embodiment, each transmitting matrix among the plurality of transmitting matrices may be an analog precoding codeword and may be associated to a respective subcarrier among the plurality of subcarriers and to a respective receiver among the plurality of receivers.

Furthermore, each transmitting matrix may correspond to a respective significant communication path between the transmitter and the respective receiver on the respective subcarrier.

In mmWave communication systems, the number of paths with significant gain is very small compared to the size of the channel matrix. Using only significant paths advantageously exploits the channel sparsity, therefore limiting the quantity of information to exchange between the BS and the UE.

Furthermore, the plurality of receiver sets $\mathcal{S}_i$ may be determined based on a similarity measure between at least two transmitting matrices among the plurality of transmitting matrices $A_{T,\pi(l,k)}^{[l]}$.

Another aspect of the invention relates to a transmitter in a millimeter wave communication system enabling analog precoding and analog combining, the transmitter being able to serve a plurality of receivers over a plurality of subcarriers. The transmitter may comprise:

a circuit for jointly determine an analog precoding matrix $F_{RF}$ and a plurality of multi-user groups $\mathcal{G}_l$, each multi-user group $\mathcal{G}_l$ being associated to a respective subcarrier l among the plurality of subcarriers, each multi-user group $\mathcal{G}_l$ containing a plurality of receivers among the plurality of receivers to be jointly served for a data transmission on the respective subcarrier l; and a circuit for processing, by using the analog precoding matrix $F_{RF}$, at least one signal to transmit to at least one receiver among the plurality of receivers on a subcarrier among the plurality of subcarriers; and characterized in that the joint determination of the analog precoding matrix $F_{RF}$ and the plurality of multi-user groups $\mathcal{G}_l$ comprises:

/a/ optimizing a beamforming function $f(F_{RF}, \mathcal{G}_1, \ldots, \mathcal{G}_L)$ of the analog precoding matrix $F_{RF}$ and the multi-user groups $\mathcal{G}_l$ with respect to the analog precoding matrix $F_{RF}$, the multi-user groups $\mathcal{G}_l$ being fixed;

/b/ optimizing a scheduling function $g(\mathcal{G}_l, F_{RF})$ of the analog precoding matrix $F_{RF}$ and the multi-user groups $\mathcal{G}_l$ with respect to the multi-user groups $\mathcal{G}_l$, a value of the analog precoding matrix $F_{RF}$ being fixed;

wherein /a/ and /b/ are iteratively repeated until a stopping criterion is met.

Yet another aspect of the invention relates to a millimeter wave communication system enabling analog precoding and analog combining, the system comprising a transmitter as defined above being able to serve a plurality of receivers over a plurality of subcarriers.

Yet another aspect of the invention relates to a non-transitory computer readable storage medium, having stored thereon a computer program comprising program instructions, the computer program being loadable into a data-processing unit and adapted to cause the data-processing unit to carry out any one of the above methods when the computer program is run by the data-processing device.

Other features and advantages of the method and apparatus disclosed herein will become apparent from the following description of non-limiting embodiments, with reference to the appended drawings.

BRIEF DESCRIPTION OF DRAWINGS

The present invention is illustrated by way of example, and not by way of limitation, in the figures of the accompanying drawings, in which like reference numerals refer to similar elements and in which.

DESCRIPTION OF EMBODIMENTS

Figure 1:
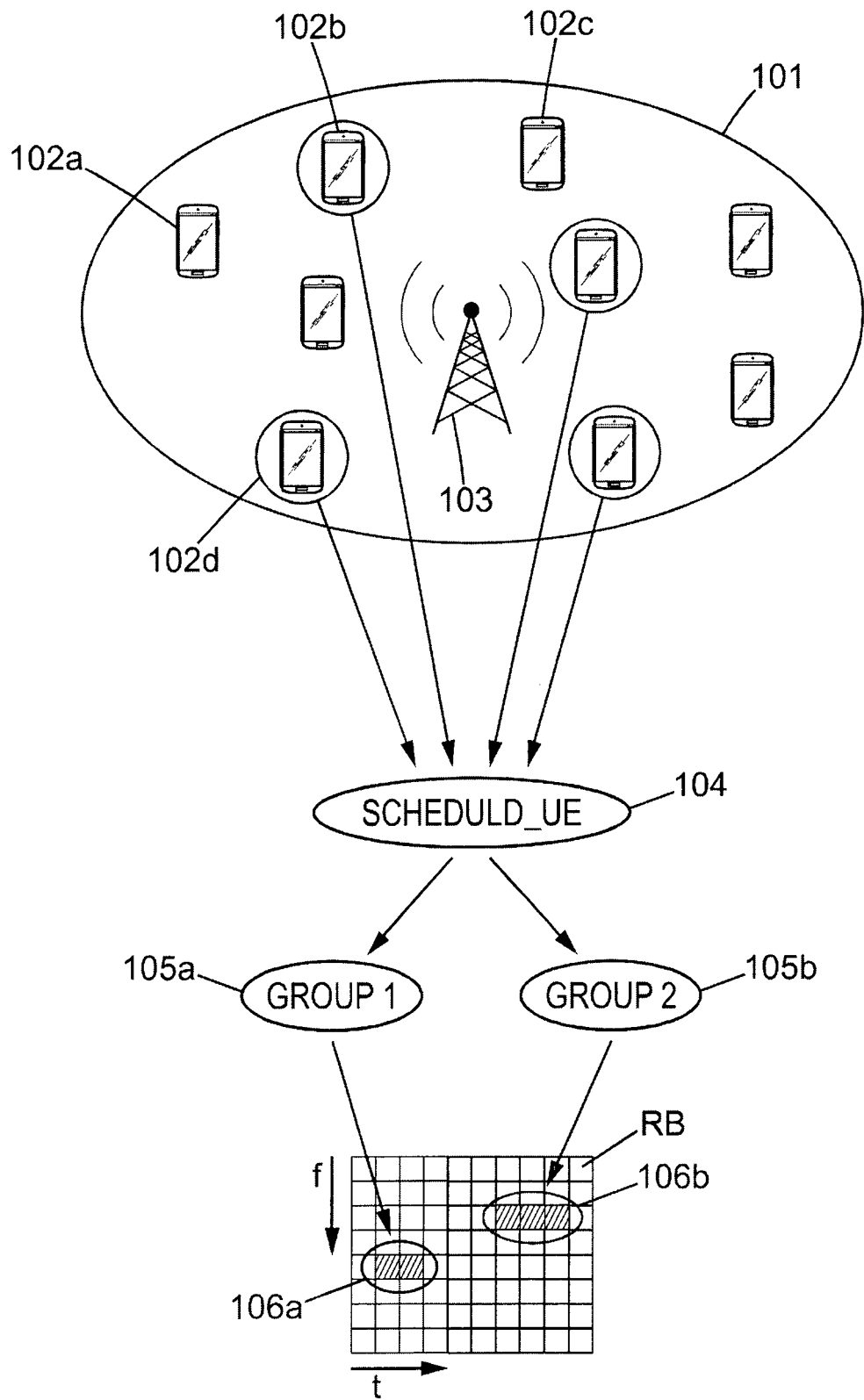
FIG. 1 represents user scheduling, resource allocation and user grouping in a wideband multi-user system.
Figure 2A:
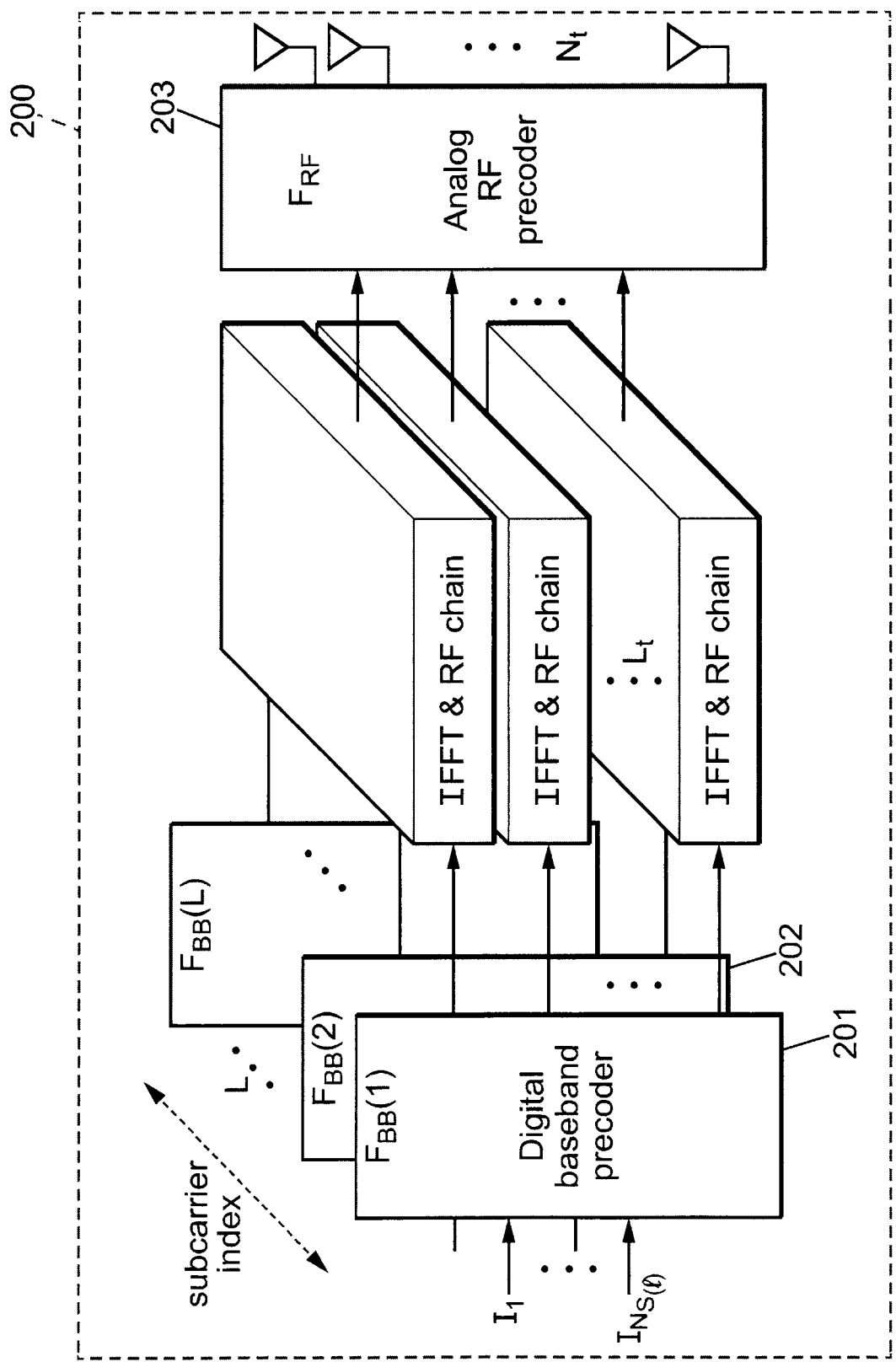
FIG. 2A represents an example of a transmitter in a hybrid wideband wireless system.
Figure 2B:
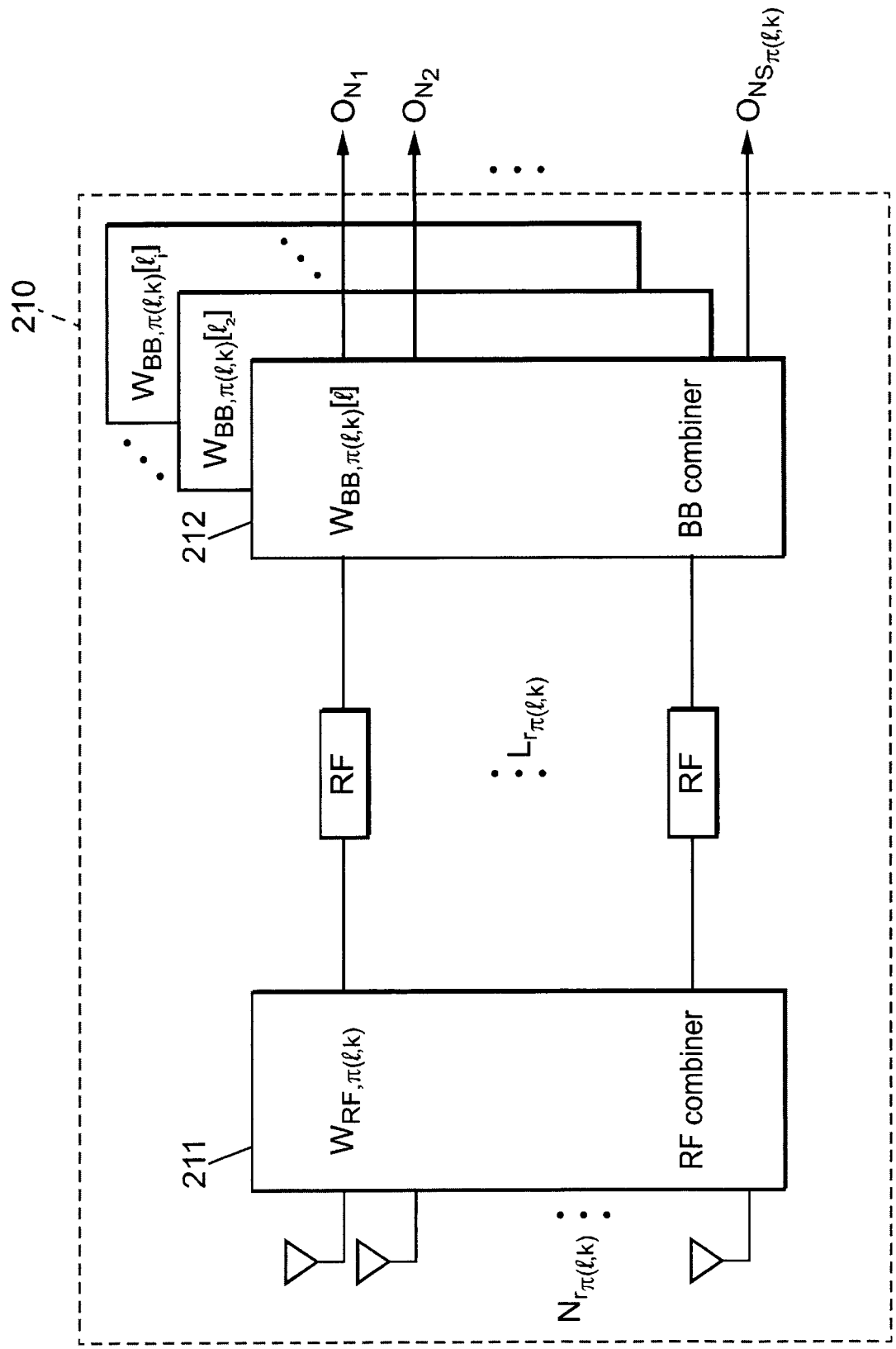
FIG. 2B represents an example of a receiver in a hybrid wideband wireless system.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

In the following, it is assumed that the analog precoding matrix $F_{RF}$ is selected from a finite-size RF precoding codebook $\mathcal{C}_{prec}$ and that the analog combining matrices $W_{RF,\pi(l,k)}$ are selected from a finite-size RF combining codebook $\mathcal{C}_{comb,\pi(l,k)}$. The RF combining codebook may be the same for all receivers, or may be different for the different receivers. Any types of codebooks may be chosen for $\mathcal{C}_{prec}$ and $\mathcal{C}_{comb,\pi(l,k)}$ for instance, Grassmannian or beamsteering codebooks. Elements of a codebook are referred to as codewords. A codeword of $\mathcal{C}_{prec}$ is referred to as "RF precoding codeword", and a codeword of $\mathcal{C}_{comb,\pi(l,k)}$ is referred to "RF combining codeword".

In one embodiment, the precoding codebook $\mathcal{C}_{prec}$ are based on an oversampled Discrete Fourier Transform, DFT, matrix, i.e. a matrix constructed by re-normalizing a submatrix selected from a DFT matrix. Such matrix may algorithmically be obtained as follows:

$W_1 = FFT(eye(N_{os}*N_t))/sqrt(N_t)$ $W_2 = norm(W_1)$ $W = W_2(1:N_t, 1:N_{os}*N_t)$ where $N_{os}$ is the oversampling ratio, FFT(X) returns the discrete Fourier transform of X, eye(sz) returns an array of size sz×sz with ones on the main diagonal and zeros elsewhere, sqrt(x) returns the square root of a number x and norm(A) returns a normalized matrix obtained from A (i.e., for each column of A, all coefficients of the column are divided by the norm of the column; therefore, each column of the obtained matrix has a norm equal to 1). The final matrix W is a submatrix of $W_2$ obtained by selecting only the first 1 to $N_t$ rows, and the first 1 to $N_{os}*N_t$ columns of $W_2$. Each column of the resulting matrix W corresponds to a codeword of the precoding codebook. The codebook precoding has $N_{os}*N_t$ codewords of size $N_t \times 1$ each.

Another example of, a precoding codebook $\mathcal{C}_{prec}$ that may be used in the present invention is given below:

$\mathcal{C}_{prec} = \{c_1, \ldots, c_{N_{os}*N_t}\}$ where the t-th component (with $t=1, \ldots, N_t$) of a codeword vector $c_i$ is equal to $$c_{i,t} = \frac{1}{N_t} e^{-j\frac{2\pi}{\lambda}(t-1)d_V \cos\theta_i}$$

The beam direction for the i-th (for $i=1, \ldots, N_{os}*N_t$) codeword is $$\theta_i = \frac{\pi}{N_{os}*N_t}\left(i - \frac{1}{2}\right),$$

where $\lambda$ is the wavelength and $d_v$ is the antenna spacing.

In both case, each codeword in the codebook is a length $N_t$ vector, where the oversampling rate is $N_{os} > 1$, $\mathcal{C}_{prec}$ is a $N_t \times (N_{os}*N_t)$ matrix with each column serving as a precoding codeword.

Of course, other precoding codebooks may be used.

The present invention proposes to jointly perform user MU grouping (i.e. determining the MU groups $\mathcal{G}_l = \{\pi(l,k); k=1, \ldots, K\}$ of K UEs that will be jointly served on the different subcarriers $l=1 \ldots L$) and RF beamforming design (i.e. determining RF precoder $F_{RF}$, and eventually the combiner $W_{RF,\pi(l,k)}$). The base band beamforming design (i.e. the determination of digital precoding and combining matrices) is not addressed here. Once the user groups and the RF beamforming matrices have been determined, any method may be used for determining the base band beamforming matrices. More specifically, the present invention proposes a joint determination of $\mathcal{G}_l|_{l=1}^L = \{\mathcal{G}_l; l=1, \ldots, K\}$, $W_{RF,\pi(l,k)}$ and $F_{RF}$ by an alternate optimization between the user scheduling and RF beamforming design.

Figure 3:
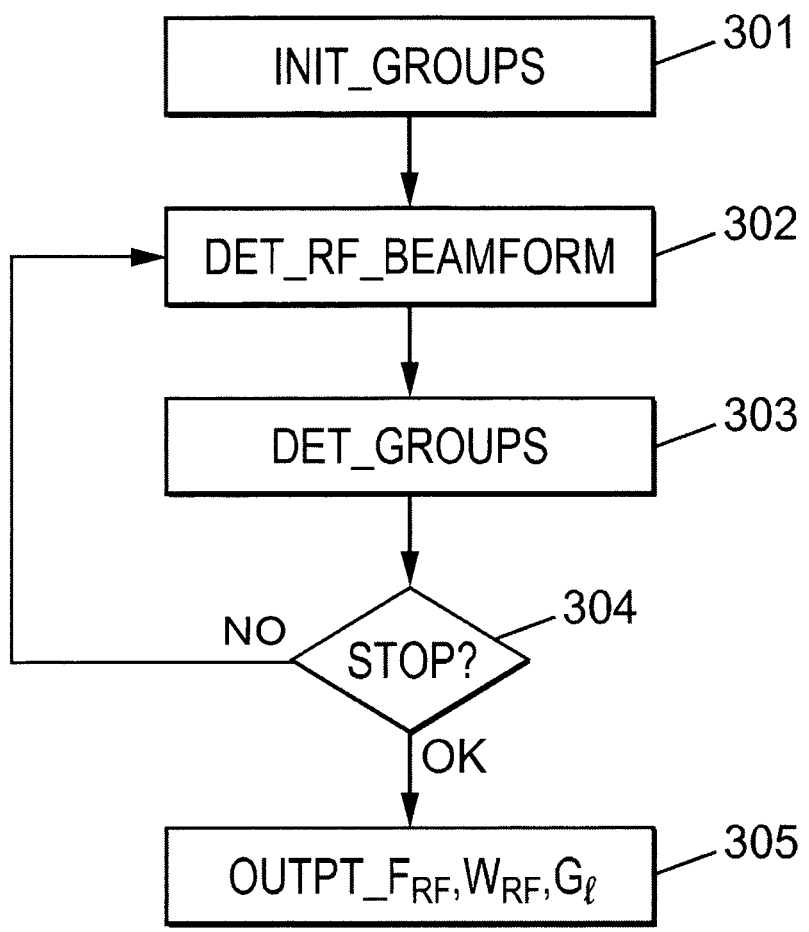
FIG. 3 is a flow chart describing a joint determination, at the transmitter, of MU groups, RF precoder $F_{RF}$ and RF combiners $W_{RF,\pi(l,k)}$ in a possible embodiment of the invention.

FIG. 3 is a flow chart describing a joint determination, at the transmitter, of MU groups $\mathcal{G}_l|_{l=1}^L$, RF precoder $F_{RF}$ and RF combiners $W_{RF,\pi(l,k)}$ in a possible embodiment of the invention. According to this embodiment, this determination may be performed by using an iterative procedure in which each iteration comprises two steps:

1/ A first step 302 during which the RF precoder $F_{RF}$ and the RF combining matrices $W_{RF,\pi(l,k)}$ are determined by optimizing a predefined RF beamforming design criterion $f(F_{RF}, W_{RF,\pi(l,k)}, \mathcal{G}_l|_{l=1}^L)$, the MU groups $\mathcal{G}_l|_{l=1}^L$ being fixed according to a previous iteration.

Such optimization may be a maximization or a minimization:

$$(F_{RF}, W_{RF,\pi(l,k)}) = \arg\max_{F_{RF}, W_{RF,\pi(l,k)}} f(F_{RF}, W_{RF,\pi(l,k)}, \mathcal{G}_l|_{l=1}^L)$$

$$\text{or } (F_{RF}, W_{RF,\pi(l,k)}) = \arg\min_{F_{RF}, W_{RF,\pi(l,k)}} f(F_{RF}, W_{RF,\pi(l,k)}, \mathcal{G}_l|_{l=1}^L);$$

2/ A second step 303 during which the MU groups $\mathcal{G}_l|_{l=1}^L$ are determined by optimizing a predefined scheduling design criterion $g\pi(l,k)$, $F_{RF}$, $W_{RF,\pi(l,k)}$, the RF beamforming matrices $W_{RF,\pi(l,k)}$ and $F_{RF}$ being fixed to the values determined in the first step.

Such optimization may be a maximization or a minimization:

$$\mathcal{G}_l|_{l=1}^L = \arg\max_{\mathcal{G}_l|_{l=1}^L} g(\pi(l,k), F_{RF}, W_{RF,\pi(l,k)})$$

$$\text{or } \mathcal{G}_l|_{l=1}^L = \arg\min_{\mathcal{G}_l|_{l=1}^L} g(\pi(l,k), F_{RF}, W_{RF,\pi(l,k)})$$

Before the first iteration of the above procedure, the MU groups $\mathcal{G}_l|_{l=1}^L$ may be initialized 301, for instance by a random draw among the user sets $S_1, \ldots, S_K$. Another possible strategy may consist in choosing the users having the largest amount of packets in the UE buffer (for Uplink transmission) or the largest amount of dedicated packets in BS buffer (for Downlink transmission).

Steps 1/ and 2/ may be alternatively repeated until a predefined convergence criterion 304 is met. This convergence criterion 304 may be, for instance, based on a mathematical distance between a matrix at a current iteration and the corresponding matrix at the previous iteration. If the distance is lower a predefined threshold, the convergence criterion is met, and $\mathcal{G}_l|_{l=1}^{L}$, $F_{RF}$, $W_{RF,\pi(l,k)}$ are outputted 305.

For instance, the optimization problem of step 1/ may be first solved without codebook constraints, i.e. by choosing $F^*_{RF}$ and $W^*_{RF,\pi(l,k)}$ that optimize $f(F_{RF}, W_{RF,\pi(l,k)}, \mathcal{G}_l|_{l=1}^{L})$ without supposing that they belong to RF precoding and combining codebooks $\mathcal{C}_{prec}$ and $\mathcal{C}_{comb,\pi(l,k)}$. The problem is then a quadratically constrained (due to power constraint) quadratic program, which may be solved for instance by a semidefinite relaxation and randomization procedure. Then, $F_{RF}$ (resp. $W_{RF,\pi(l,k)}$) may be defined as being equal to the codeword of the RF precoding codebook $\mathcal{C}_{prec}$ (resp. the RF combining codebook $\mathcal{C}_{comb,\pi(l,k)}$) that is the closest, according to a mathematical distance, to each column of $F^*_{RF}$ (resp. $W^*_{RF,\pi(l,k)}$).

Of course, steps 1/ and 2/ may be performed in a different order. In some embodiments, 2/ may be performed before 1/.

It has to be noticed that the RF combiners $W_{RF,\pi(l,k)}$ may be decided and reported to the transmitter in the selected beam pairs. Actually, this may lead to performance degradation, but that case is more aligned with the 3GPP NR Rel. 15 specification. In that case, the RF combiner $W_{RF,\pi(l,k)}$ are not determined during the above joint optimization, which is only performed between $\mathcal{G}_l|_{l=1}^{L}$ and $F_{RF}$. Hence, the determination of $W_{RF,\pi(l,k)}$ may be dropped in some embodiments.

In case where $W_{RF,k}$ is determined during the joint optimization procedure at transmitter's side, the transmitter may inform each scheduled UE k the subcarrier(s) it has been assigned and the indices of each column vector of the $W_{RF,k}$ in the RF combining codebook. Upon receiving these indices, each scheduled UE k may implement the RF combiner accordingly. The transmitter will implement the RF precoder $F_{RF}$. Once the RF beamforming matrices at transmitter and receiver have been chosen, the transmitter may send RSs to estimate the equivalent channel $H_k^{eq}[l]$ for each scheduled user k, where $H_k^{eq}[l]=W_{RF,k}^H H_k[l] F_{RF}$, at receiver's side.

Each scheduled UE k may then feedback the equivalent channel $H_k^{eq}[l]$. The transmitter may therefore calculate the base band precoder $F_{BB}[l]$ for each subcarrier l. At the receiver's side, the receiver (UE) can implement a base band receive filter $W_{BB,k}[l]$. Alternatively, the base band receive filter $W_{BB,k}[l]$ may be calculated by the transmitter and sent to the receiver by using downlink signaling.

Some embodiments of the above joint determination procedure are now provided. These embodiments exploit the sparsity of the communication channel in mmWave systems. Indeed, in case of a mmWave system with large antenna arrays, many paths are highly attenuated, and the number $N_{spars}$ of paths with significant gain is expected to be small compared to the size $N_r \times N_{r_{\pi(l,k)}}$ of the channel matrix $H_{\pi(l,k)}$[l]. By "significant gain", it is meant that the gain of the path is greater than a predefined threshold. If the gain is lower than this threshold, it is set to zero. Consequently, and due to the high directivity of antenna arrays, the channel matrices in angular domain between the BS and the UEs are expected to be "sparse", i.e. to have only a few non-zero entries compared to its size.

The channel matrix $H_{\pi(l,k)}[l]$ of the communication link between the BS and the UE $\pi(l,k)$ on the l-th subcarrier may thus be described with a very small number of parameters:

$$H_{\pi(l,k)}[l] = \sum_{i=1}^{N_{spars}} d_{b,\pi(l,k),i}[l] a_{R,\pi(l,k),i}^{[l]} (a_{T,\pi(l,k),i}^{[l]})^H$$

where $N_{spars}$ corresponds to the number of significant paths; $a_{T,\pi(l,k),i}^{[l]}$ (resp. $a_{R,\pi(l,k),i}^{[l]}$ is a direction vector containing the angle of departure (AoD) (resp. the angle of Arrival (AoA)) information for the corresponding significant path i, and $d_{b,\pi(l,k),i}^{[l]}$[l] is a complex coefficient indicating the strength of the corresponding significant path i.

In one embodiment, the AoD direction vectors $a_{T,\pi(l,k),i}^{[l]}$ can be approximated by codewords of the precoding codebook $\mathcal{C}_{prec}$ and the AoA direction vectors $a_{T,\pi(l,k),i}^{[l]}$ can be approximated by codewords of the combining codebook $\mathcal{C}_{comb,\pi(l,k)}$.

It has to be noticed that $N_{spars}$ is a variable that can be determined or configured according to the channel sparsity, the channel estimation accuracy and the feedback capability.

The channel matrix $H_{\pi(l,k)}[l]$ may also be written:

$$H_{\pi(l,k)}[l] = A_{R,\pi(l,k)}^{[l]} D_{\pi(l,k)}[l] (A_{T,\pi(l,k)}^{[l]})^H$$

where $A_{R,\pi(l,k),i}^{[l]} \in \mathbb{C}^{N_r \times N_{spars}}$ is the matrix whose columns are equal to $a_{R,\pi(l,k),i}^{[l]}$, for i=1, ..., $N_{spars}$; $A_{T,\pi(l,k)}^{[l]} \in \mathbb{C}^{N_t \times N_{spars}}$ is the matrix whose columns are equal to $a_{T,\pi(l,k),i}^{[l]}$, for i=1, ..., $N_{spars}$; and $D_{\pi(l,k)}[l] \in \mathbb{C}^{N_{spars} \times N_{spars}}$ is a diagonal matrix whose diagonal coefficients are equal to $d_{b,\pi(l,k),i}[l]$, for i=1, ..., $N_{spars}$.

Several algorithms of the prior art have been developed for determining the above sparse representation of the channel matrix, and outputting for instance the set of parameters $\{N_{spars}, \{a_{R,\pi(l,k),i}^{[l]}, a_{T,\pi(l,k),i}^{[l]}, d_{b,\pi(l,k),i}[l]\}; i=1, ..., N_{spars}\}$, or equivalently $\{N_{spars}, A_{R,\pi(l,k)}^{[l]}, A_{T,\pi(l,k)}^{[l]}, D_{\pi(l,k)}[l]\}$. These algorithms are not detailed here, and any of them may be used in the context of the present invention (see for instance the patent application EP16306171.6; "Channel estimation and hybrid precoding for millimeter wave cellular systems", A. Alkhateeb et al., IEEE Journal of Selected Topics in Signal Processing, vol. 8, no. 5, pp. 831-846, October 2014; or "Compressive channel estimation and tracking for large arrays in mm wave picocells", Z. Marzi et al., IEEE Journal of Selected Topics in Signal Processing, vol. 10, no. 3, pp. 514-527, April 2016).

According to the 5G NR specification, the beam management procedure comprises the following operations:

Beam sweeping: A spatial area is covered with a set of beams transmitted and received according to pre-specified intervals and directions;

Beam measurement: Reference Signals (RSs) are transmitted from the BS to the UEs, for all possible BS/UE beam pairs (i.e. for all the possible pairs of a precoding matrix $F_{RF} \in \mathcal{C}_{prec}$ and a combining matrix $W_{RF,\pi(l,k)} \in \mathcal{C}_{comb,\pi(l,k)}$). A quality indicator is calculated, at the UE, for each of the beam pairs (for instance, the quality indicator may be equal to or derived from the Reference Signal Received Power, RSRP, or the Reference Signal Received Quality, RSRQ);

Beam determination: At least one beam pair is selected, at the UE, based on its performance metric. For instance, the beam pair(s) that maximize(s) the performance metric, or the P beam pairs (with P a predefined integer) having the P higher performance metrics, may be selected;

Beam reporting: The UE may report, to the BS, the index (or the indices) of the selected beam pair(s) and the associated quality indicator(s).

The RF beamforming matrices $F_{RF,k}$ and $W_{RF,\pi(l,k)}$ can then be chosen, at the BS, based on the index (or the indices) of the selected beam pair(s) and the associated quality indicator(s).

In one embodiment of the invention, during the beam reporting operation described above, the UE may feedback the index (indices) in the corresponding codebooks $\{\mathcal{C}_{prec}, \mathcal{C}_{comb,\pi(l,k)}\}$ of the beam pair(s) $\{a_{R,\pi(l,k),i}^{[l]}, a_{T,\pi(l,k),i}^{[l]}\}$ selected during the beam determination operation, together with the associated quality indicator(s). The quality indicator may correspond for instance to the reference signal received power when the RF precoder using $a_{T,\pi(l,k),i}^{[l]}$ is implemented at the transmitter and the RF combiner using $a_{R,\pi(l,k),i}^{[l]}$ is implemented at the receiver:

$$\xi_{\pi(l,k),i}[l] = |(a_{R,\pi(l,k),i}^{[l]})^H H_{\pi(l,k)}[l] a_{T,\pi(l,k),i}^{[l]}|^2$$

The transmitter may therefore collect all the indices of the selected beam pair(s), or equivalently all the matrices (also called "subspaces" hereinafter) $A_{T,\pi(l,k)}^{[l]}$, for all active UEs $\pi(l,k) \in \mathcal{J}$ ($\mathcal{J}$ being the set of active UEs of the cell), and for all subcarriers $l=1, \ldots, L$. The transmitter may then perform a clustering of the active UEs $\pi(l,k) \in \mathcal{J}$ into K independent sets $\mathcal{S}_1, \ldots, \mathcal{S}_K$, based on all the LJ subspaces $A_{T,\pi(l,k)[l]}$. Such clustering makes it possible to limit the interference between the users in case of a random selection, from different sets, of UEs scheduled on the same subcarrier. This random selection can be performed during the initialization of the MU group. For example, if the initialization of the MU groups is based on a random draw, drawing each of the K users in different independent sets leads to lower interference as compared to a complete random selection of K users from the set $\mathcal{J}$ of all active users.

Performing the clustering based on the LJ received subspaces $A_{T,\pi(l,k)}^{[l]}$ advantageously exploits the sparsity of the communication channel in mmWave systems, because it uses only limited feedback information (that is, the selected beam pair(s)).

In one embodiment, the clustering of all the active UEs of the cell and for all the subcarriers into K independent sets is based on a similarity (or "affinity") measure between the subspaces $A_{T,\pi(l,k)}^{[l]}$ (for all $\pi(l,k) \in \mathcal{J}$ and $l=1, \ldots, L$). Basically, the principle is that two subspaces associated to a high similarity measure belong to the same cluster, and two subspaces associated to a low similarity measure belong to different clusters. For instance, such clustering may comprise the following steps:

Compute the similarity matrix $M_S$ of dimension LJ×LJ (J being the cardinality of $\mathcal{J}$), whose (i,j)-th element (i being the row index and j being the column index) is equal to sim $(A_{T,i}^{[l_i]}, A_{T,j}^{[l_j]})$ if $i \neq j$ and equal to zero if $i=j$;

Let D be the diagonal matrix whose (i,i)-th element is equal to the sum of the elements of the i-th row of $M_S$; construct the matrix $Z=D^{-1/2} M_S D^{-1/2}$;

Find the K largest eigenvalues of Z (the corresponding eigenvectors being chosen to be orthogonal to each other in case of repeated eigenvalues) and form the matrix $M_1 \in \mathbb{C}^{LJ \times K}$ by stacking the eigenvectors in the columns;

Form the matrix $M_2$ from $M_1$ by normalizing each of the rows of $M_1$ to unit length;

Considering each row of $M_2$ as a point in $\mathbb{C}^K$, cluster these rows into K clusters via a clustering algorithm that attempts to minimize distortion (for instance, the K-means algorithm); and Assign the original subspace $A_{T,i}^{[l]}$ to cluster j if and only if row i of the matrix $M_2$ is assigned to cluster j.

In the above, $A_{T,i}^{[l_i]}$ (for $i=1, \ldots, LJ$) corresponds to the subspace $A_{T,\pi(l,k)}^{[l]}$ such that $\pi(l,k)=i \cdot 1_i$ is the subcarrier associated to receiver $\pi(l,k)=i$.

The above procedure outputs K sets $\mathcal{S}_1, \ldots, \mathcal{S}_K$. If $A_{T,\pi(l,k)}^{[l]} \in \mathcal{S}_k$, that means that, for the subcarrier l, the UE$\pi(l,k)$ is in the set $\mathcal{S}_k$.

Any mathematical similarity measure can be used. Two examples of similarity measures $sim_1$ and $sim_2$ between two subspaces $S_1$ and $S_2$ are given below:

$$sim_1(S_1, S_2) = \frac{1}{\sqrt{\min(d_1, d_2)}} \|S_1^H S_2\|_F$$

where $d_1$ and $d_2$ are the dimensions of the subspaces $S_1$ and $S_2$, respectively;

$$sim_2(S_1, S_2) = e^{\left(-\sum_{m=1}^{\min(d_1,d_2)} \sin^2(\theta_m)\right)}$$

where $\theta_m$ is the m-th principal angle of the subspaces $S_1$ and $S_2$.

Of course, the present invention is not limited to the class of algorithms presented above. Other algorithms may be used. For instance, the sets may be formed by a random draw among the set of subspaces $$\{A_{T,i}^{[l_i]}\}_{i=1}^{LJ}.$$

Figure 4:
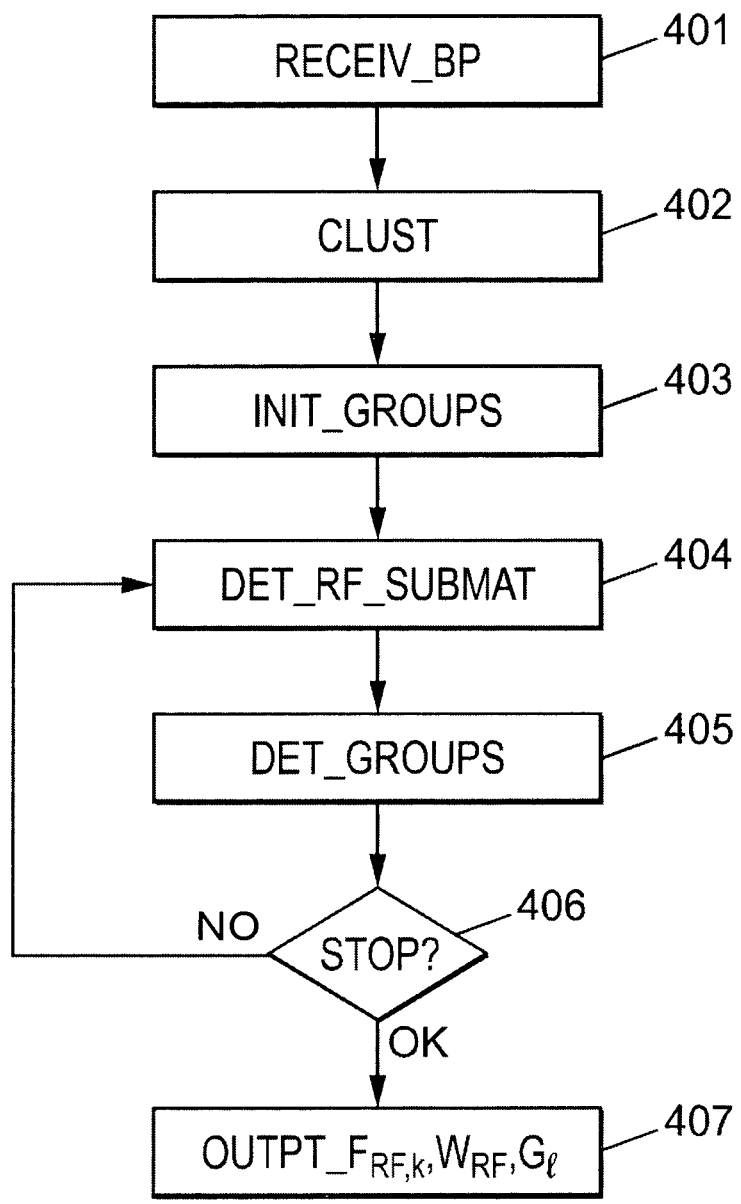
FIG. 4 is a flow chart describing a joint determination of MU groups, RF precoder $F_{RF}$ and RF combiners $W_{RF,\pi(l,k)}$ based on the determined user sets $S_1, \ldots, S_K$ in a possible embodiment of the invention.

In one or several embodiments, the joint determination of MU groups $\mathcal{G}_l|_{l=1}^L$, of the RF precoding matrix $F_{RF}$ and eventually the RF combining matrices $W_{RF,\pi(l,k)}$ may be performed based on the determined user sets $\mathcal{S}_1, \ldots, \mathcal{S}_K$. FIG. 4 is a flow chart describing a joint determination of MU groups, RF precoder $F_{RF}$ and RF combiners $W_{RF,\pi(l,k)}$ based on the determined user sets $\mathcal{S}_1, \ldots, \mathcal{S}_K$ in a possible embodiment of the invention.

In the following, the RF precoder $F_{RF}$ is viewed as a concatenation of K RF precoding submatrices $F_{RF,k}$ (for $k=1, \ldots, K$), where $F_{RF,k}$ is the part of the RF precoder corresponding to the users of the clustering set $\mathcal{S}_k$: $F_{RF}=[F_{RF,1} \ldots F_{RF,K}]$.

As detailed above, the transmitter may receive 401, from the UEs, the matrices $A_{T,j}^{[l]}$, $A_{R,j}^{[l]}$, and $D_j[l]$, for all active users $j \in \mathcal{J}$ of the cell. The transmitter may then perform a clustering 402 of the subspaces $$\{A_{T,i}^{[l_i]}\}_{i=1}^{LJ}$$

into K user sets $\mathcal{S}_1, \ldots, \mathcal{S}_K$. The joint determination procedure may then begin by initializing 403 the MU groups $\mathcal{G}_l|_{l=1}^L$, for instance by a random draw among all the K user sets $\mathcal{S}_1, \ldots, \mathcal{S}_K$. Then, the first step 404 of the optimization procedure (i.e. step 302 of FIG. 3) may comprise a determination of all the RF precoding submatrices $F_{RF,k}$ (for $k=1, \ldots, K$) (and eventually the RF combining matrices $W_{RF,\pi(l,k)}$ for $k=1, \ldots, K$ and $l=1, \ldots, L$) by optimizing a predefined RF beamforming design criterion $f(F_{RF,k}, W_{RF,\pi(l,k)}, \mathcal{G}_l|_{l=1}^L)$, with the MU groups $\mathcal{G}_l|_{l=1}^L$ being fixed. Step 405 corresponds to the second step of the optimization procedure presented above (i.e. step 303 of FIG. 3), during which the MU groups $\mathcal{G}_l|_{l=1}^L$ are determined by optimizing a predefined scheduling design criterion $g(\pi(l,k), F_{RF,k}, W_{RF,\pi(l,k)})$, the RF beamforming matrices $W_{RF,\pi(l,k)}$ and $F_{RF,k}$ being fixed. Steps 404 and 405 may be alternatively repeated until a predefined convergence criterion 406 is met. When the convergence criterion 406 is met, $\mathcal{G}_l|_{l=1}^L$, $F_{RF,k}$ and $W_{RF,\pi(l,k)}$ may be outputted 407.

A first example of such joint determination procedure is presented below, in the case of a maximization of the average wideband sum rate of the system. The user sets $\mathcal{S}_1, \ldots, \mathcal{S}_K$ and the matrices $A_{T,j}^{[l]}, A_{R,j}^{[l]}$ and $D_j[l]$, for all active users $j \in \mathcal{J}$ of the cell and for all the subcarriers $l=1, \ldots, L$ are supposed to be known at the transmitter.

Due to the information theory duality between an information theory broadcast channel and its dual multiple access channel, the sum rate of the downlink transmission across all the subcarriers may be lower bounded by its dual uplink transmission over all subcarriers with equal power allocation. Therefore, the capacity of the downlink transmission across all subcarriers can be lower bounded by:

$$\frac{1}{L} \sum_{l=1}^L C_{RF}[l] \geq$$

$$\frac{1}{L} \sum_{l=1}^L \log \left| \rho \sum_{k \in \mathcal{G}_l} F_{RF}^H H_{\pi(l,k)}^H[l] W_{RF,\pi(l,k)} W_{RF,\pi(l,k)}^H H_{\pi(l,k)}[l] F_{RF} + I \right|$$

where $\rho$ is a power scaling constant.

Assuming that the clustering reduces the multi-user interference between different cluster sets, we can write that $F_{RF,i}^H A_{T,k}^{[l]} \approx 0, \forall i \neq k$ Therefore the right-hand side of the above inequality may be approximated by:

$$\frac{1}{L} \sum_{l=1}^L \sum_{k=1}^K \log \left| \rho F_{RF,k}^H H_{\pi(l,k)}^H[l] W_{RF,\pi(l,k)} W_{RF,\pi(l,k)}^H H_{\pi(l,k)}[l] F_{RF} + I \right|$$

According to the sparse representation of the channel matrix, $H_{\pi(l,k)}[l]$ may be replaced by $A_{R,\pi(l,k)}^{[l]} D_{\pi(l,k)}[l] (A_{T,\pi(l,k)}^{[l]})^H$ in the previous expression:

$$\frac{1}{L} \sum_{l=1}^L C_{RF}[l] \geq$$

$$\frac{1}{L} \sum_{l=1}^L \sum_{k=1}^K \log \left| \rho F_{RF,k}^H A_{T,\pi(l,k)}^{[l]} D_{\pi(l,k)}^H[l] (A_{R,\pi(l,k)}^{[l]})^H W_{RF,\pi(l,k)} W_{RF,\pi(l,k)}^H \right.$$

$$\left. A_{R,\pi(l,k)}^{[l]} D_{\pi(l,k)}[l] (A_{T,\pi(l,k)}^{[l]})^H F_{RF,k} + I \right|$$

The RF beamforming design criterion may thus be written:

$$f(W_{RF,\pi(l,k)}, F_{RF}) =$$

$$\frac{1}{L} \sum_{l=1}^L \sum_{k=1}^K \log \left| \rho F_{RF,k}^H A_{T,\pi(l,k)}^{[l]} D_{\pi(l,k)}^H[l] (A_{R,\pi(l,k)}^{[l]})^H W_{RF,\pi(l,k)} \right.$$

$$\left. W_{RF,\pi(l,k)}^H A_{R,\pi(l,k)}^{[l]} D_{\pi(l,k)}[l] (A_{T,\pi(l,k)}^{[l]})^H F_{RF,k} + I \right|$$

The determination of the RF precoder and combiner according to step 1/ of the procedure may thus be performed as follows:

Let $\mathcal{U} = \{\pi(l,k); l=1, \ldots, L \text{ and } k=1, \ldots, K\}$ and $\mathcal{U}_{unique}$ be the set $\mathcal{U}$ with all repeating elements removed. $|\mathcal{U}_{unique}|$ denotes the cardinality of $\mathcal{U}_{unique}$. Define the mapping function:

$$\gamma: \mathcal{U}_{unique} \times \{1, \ldots, L\} \to \{1, \ldots, L\}$$

$$\mathcal{U}_{unique}(i), l \mapsto \gamma(\mathcal{U}_{unique}(i), l)$$

which indicates that receiver $\mathcal{U}_{unique}(i)$ is the $\gamma(\mathcal{U}_{unique}(i), l)$-th user on subcarrier l, for all $i=1, \ldots, |\mathcal{U}_{unique}|$;

Initialize RF combiner $W_{RF,\pi(l,k)}^{[0]}$ for all scheduled users.

Let $Y_{RF,\pi(l,k)}^{[0]} = W_{RF,\pi(l,k)}^{[0]} (W_{RF,\pi(l,k)}^{[0]})^H$ for all $l=1, \ldots, L$ and $k=1, \ldots, K$ Initialize $t=0$ While a convergence criterion is not met, perform:

For $k=1, \ldots, K$, compute $$X_k^{[t]} = \underset{t_l, X_k}{\mathrm{argmax}} \prod_{l=1}^L t_l$$

$$tr(X_k) \leq L_r$$

$$\text{s.t. } \det\left( \frac{P_{tot}[l]}{L_r} X_k H_{\pi(l,k)}^H[l] Y_{\pi(l,k)}^{[t]} H_{\pi(l,k)}[l] + I \right) \geq t_l,$$

$$\forall l = 1, \ldots, L$$

where $\det(M)$ is the determinant of a matrice M

For $i=1, \ldots, |\mathcal{U}_{unique}|$, compute $$Y_i^{[t+1]} = \underset{u_l, Y_i}{\mathrm{argmax}} \prod_{l=1}^L u_l$$

$$tr(Y_i) \leq L_r$$

$$\text{s.t. } \det\left( \frac{P_{tot}[l]}{L_r} H_i[l] X_{\gamma(\mathcal{U}_{unique}(i),l)}^{[t]} H_i^H[l] Y_i + I \right) \geq u_l,$$

$$\forall l = 1, \ldots, L$$

$$t = t+1$$

If rank constraints are satisfied, then let $X_k^{opt} = X_k^{[t]}$ and $Y_{\pi(l,k)}^{opt} = Y_i^{[t+1]}$, with $X_k^{[t]}$ and $Y_i^{[t+1]}$ being obtained in the above maximization problem, and compute, for $k=1, \ldots, K$:

$$F_{RF,k} = (X_k^{opt})^{1/2} \text{ and } W_{RF,\pi(l,k)} = (Y_{\pi(l,k)}^{opt})^{1/2}$$

If rank constraints are not satisfied, then perform the following randomization procedure, for $k=1, \ldots, K$:

Generate random Gaussian matrices $V_1$ and $V_2$, each component of $V_1$ and $V_2$ being independent and identically distributed (i.i.d.) according to a distribution $\mathcal{N}_\mathbb{C}(0,1)$ Let $X_k^* = X_k^{[t]}$ and $Y_{\pi(l,k)}^* = Y_i^{[t+1]}$, with $X_k^{[t]}$ and $Y_i^{[t+1]}$ be obtained in the above maximization problem. Perform singular-value decompositions (SVD) of $X_k^*$ and $Y_{\pi(l,k)}^*$:

$$X_k^* = U_{X_k^*} \Lambda_{X_k^*} U_{X_k^*}^H$$

$$Y_{\pi(l,k)}^* = U_{Y_{\pi(l,k)}^*} \Lambda_{Y_{\pi(l,k)}^*} U_{Y_{\pi(l,k)}^*}^H$$

Define:

$$F_{RF,k} = U_{X_k^*} \Lambda_{X_k^*}^{1/2} V_1$$

$$W_{RF,\pi(l,k)} = U_{Y_{\pi(l,k)}^*} \Lambda_{Y_{\pi(l,k)}^*}^{1/2} V_2$$

Normalize each column of $F_{RF,k}$ and $W_{RF,\pi(l,k)}$ such that they are unit vector.

Repeat $N_{rand}$ times the above steps of the randomization procedure ($N_{rand}$ being a predefined integer number), and choose the one that yields to the largest value of the considered RF beamforming design criterion.

Find the codewords in the respective codebooks $\mathcal{C}_{prec}$ and $\mathcal{C}_{comb,\pi(l,k)}$ which minimize a distance with the columns of $F_{RF,k}$ and $W_{RF,\pi(l,k)}$.

The initialization of the RF combiner $W_{RF,\pi(l,k)}^{[0]}$ for all scheduled users, for example, may be performed by a random selection of each column of $W_{RF,\pi(l,k)}^{[0]}$ in the RF combining codebook $\mathcal{C}_{comb,\pi(l,k)}$.

In the above procedure, it is considered that rank constraints are satisfied if the ranks of the matrices $F_{RF,k}$ and $W_{RF,\pi(l,k)}$ are equal to $L_{r_{\pi(l,k)}}$. Indeed, in that case, the ranks of the optimal solutions $X_k^{opt}$ and $Y_{\pi(l,k)}^{opt}$ are also equal to $L_{r_{\pi(l,k)}}$. It is considered that rank constraints are not satisfied if at least one of the matrices $F_{RF,k}$ and $W_{RF,\pi(l,k)}$ have a rank not equal to $L_{r_{\pi(l,k)}}$.

It has to be noticed that the larger $N_{rand}$ is, the more accurate the randomization procedure is.

Always in the case of a maximization of the average wideband sum rate of the system, the scheduling design criterion to maximize may be:

$$g(\pi(l,k), F_{RF}, W_{RF,\pi(l,k)}) =$$

$$\frac{1}{L}\sum_{l=1}^{L}\sum_{k=1}^{K} \log \left| \rho F_{RF,k}^H A_{T,\pi(l,k)}^{[l]} D_{\pi(l,k)}^H [l] \left( A_{R,\pi(l,k)}^{[l]} \right)^H W_{RF,\pi(l,k)} \right.$$

$$\left. W_{RF,\pi(l,k)}^H A_{R,\pi(l,k)}^{[l]} D_{\pi(l,k)}[l] \left( A_{T,\pi(l,k)}^{[l]} \right)^H F_{RF,k} + I \right|$$

Knowing that the RF precoders and combiners are fixed during the MU grouping design, the above optimization is a discrete optimization which can be solved by simple brute force full search or advanced methods such as genetic algorithm.

A second example of the optimization procedure is now provided, in the case of a maximization of the minimal receive equivalent channel gain. In that case, the RF beamforming design criterion may be written:

$$f(W_{RF,\pi(l,k)}, F_{RF}) = \min_{l,k} \| W_{RF,\pi(l,k)}^H H_{\pi(l,k)}[l] F_{RF,k} \|_F$$

The determination of the RF precoder and combiner according to step 1/ of the above procedure may thus be performed as follows:

Let $\mathcal{U}$, $\mathcal{U}_{unique}$ and $\gamma(\mathcal{U}_{unique}(i),l)$ be defined as above;
Initialize RF combiner $W_{RF,\pi(l,k)}^{[0]}$ for all scheduled users.

Let $Y_{RF,\pi(l,k)}^{[0]} = W_{RF,\pi(l,k)}^{[0]} \left( W_{RF,\pi(l,k)}^{[0]} \right)^H$ for all $l=1, \ldots, L$ and $k=1, \ldots, K$.

Initialize $t=0$.

While a convergence criterion is not met, perform:

- For $k = 1, \ldots, K$, compute $$X_k^{[t]} = \underset{f,X_k}{\mathrm{argmax}} f$$

$$tr(X_k) \leq L_t$$

s.t. $tr(X_k H_{\pi(l,k)}^H[l] Y_{\pi(l,k)}^{[t]} H_{\pi(l,k)}[l]) \geq f$, $\forall l = 1, \ldots, L$ where tr(M) is the trace of a matrice M

- For $i = 1, \ldots, |\mathcal{U}_{unique}|$, compute $$Y_i^{[t+1]} = \underset{g,Y_i}{\mathrm{argmax}} g$$

$tr(Y_i) \leq L_r$ s.t. $tr\left( H_i[l] X_{\gamma(\mathcal{U}_{unique}(i),l)}^{[t]} H_i^H[l] Y_i \right) \geq g$, $\forall l = 1, \ldots, L$ $t = t + 1$ If rank constraints are satisfied, let $X_k^{opt} = X_k^{[t]}$ and $Y_{\pi(l,k)}^{opt} = Y_i^{[t+1]}$, with $X_k^{[t]}$ and $Y_i^{[t+1]}$ being obtained in the above maximization problem, and compute, for $k=1, \ldots, K$:

$F_{RF,k} = (X_k^{opt})^{1/2}$ and $W_{RF,\pi(l,k)} = (Y_{\pi(l,k)}^{opt})^{1/2}$ If rank constraints are not satisfied, then perform the randomization procedure of the first example Find the codewords in the respective codebooks $\mathcal{C}_{prec}$ and $\mathcal{C}_{comb,\pi(l,k)}$ which minimize a distance with the columns of $F_{RF,k}$ and $W_{RF,\pi(l,k)}$.

The initialization of the RF combiner $W_{RF,\pi(l,k)}^{[0]}$ for all scheduled users may be performed as in the previous example. The rank constraints of the above procedure are similar to those of the previous example.

Always in the case of a maximization of the minimal receive equivalent channel gain, the scheduling design criterion to maximize may be:

$$g(\pi(l,k), F_{RF}, W_{RF,\pi(l,k)}) = \min_{\substack{l=1,\ldots,L \\ k=1,\ldots,K}} \| W_{RF,\pi(l,k)}^H H_{\pi(l,k)}[l] F_{RF,k} \|_F$$

Many other RF beamforming/scheduling design criteria may be used.

For instance, in the context of wideband user scheduling (i.e. each scheduled user occupies all the subcarriers and no frequency multiplexing that allocates different users on different subcarriers is allowed), an example of scheduling design criterion to maximize is:

$$g(\pi(l,k), F_{RF}, W_{RF,\pi(l,k)}) =$$

$$\frac{1}{L}\sum_{l=1}^{L}\sum_{k=1}^{K}\sum_{j=1}^{L_{r_k}} \log \left( \rho \lambda_j \left( A_{R,\pi(l,k)}^{[l]} D_{\pi(l,k)}[l] \left( A_{T,\pi(l,k)}^{[l]} \right)^H \right.\right.$$

$$\left.\left. F_{RF,k} F_{RF,k}^H A_{T,\pi(l,k)}^{[l]} D_{\pi(l,k)}^H[l] \left( A_{R,\pi(l,k)}^{[l]} \right)^H \right) + I \right)$$

In the context of fairness issue for scheduling, an example of scheduling design criterion to maximize is:

$$g(\pi(l,k), F_{RF}, W_{RF,\pi(l,k)}) =$$

$$\frac{1}{L}\sum_{l=1}^{L}\sum_{k=1}^{K} \alpha_{\pi(l,k)} \log \left| \rho F_{RF,k}^H A_{T,\pi(l,k)}^{[l]} D_{\pi(l,k)}^H[l] \left( A_{R,\pi(l,k)}^{[l]} \right)^H W_{RF,\pi(l,k)} \right.$$

$$\left. W_{RF,\pi(l,k)}^H A_{R,\pi(l,k)}^{[l]} D_{\pi(l,k)}[l] \left( A_{T,\pi(l,k)}^{[l]} \right)^H F_{RF,k} + I \right|$$

where $\alpha_{\pi(l,k)}$ are weight scalars associated to receivers $\pi(l,k)$.

By "in the context of fairness issue for scheduling", it is meant the following. By optimizing the scheduling criterion, UEs with potentially higher rate are more likely to be scheduled. This is not "fair" from the system operation point of view, because some potentially low rate UEs might never get the chance to transmit. In order to overcome this problem, many techniques can be applied. The above design criterion is an example of such techniques consists, as above, in introducing some positive weighting factors $\alpha_{\pi(l,k)}$ to adjust the instantaneous rate of user. For example if one UE has not been scheduled for a long time, its weighting factor may be increased. In this case even if the user has lower rate, it is more likely to be scheduled after some time.

Knowing that the RF precoders and combiners are fixed during the MU grouping design, the above optimization is a discrete optimization which can be solved by simple brute force full search or advanced methods such as genetic algorithm.

Figure 5:
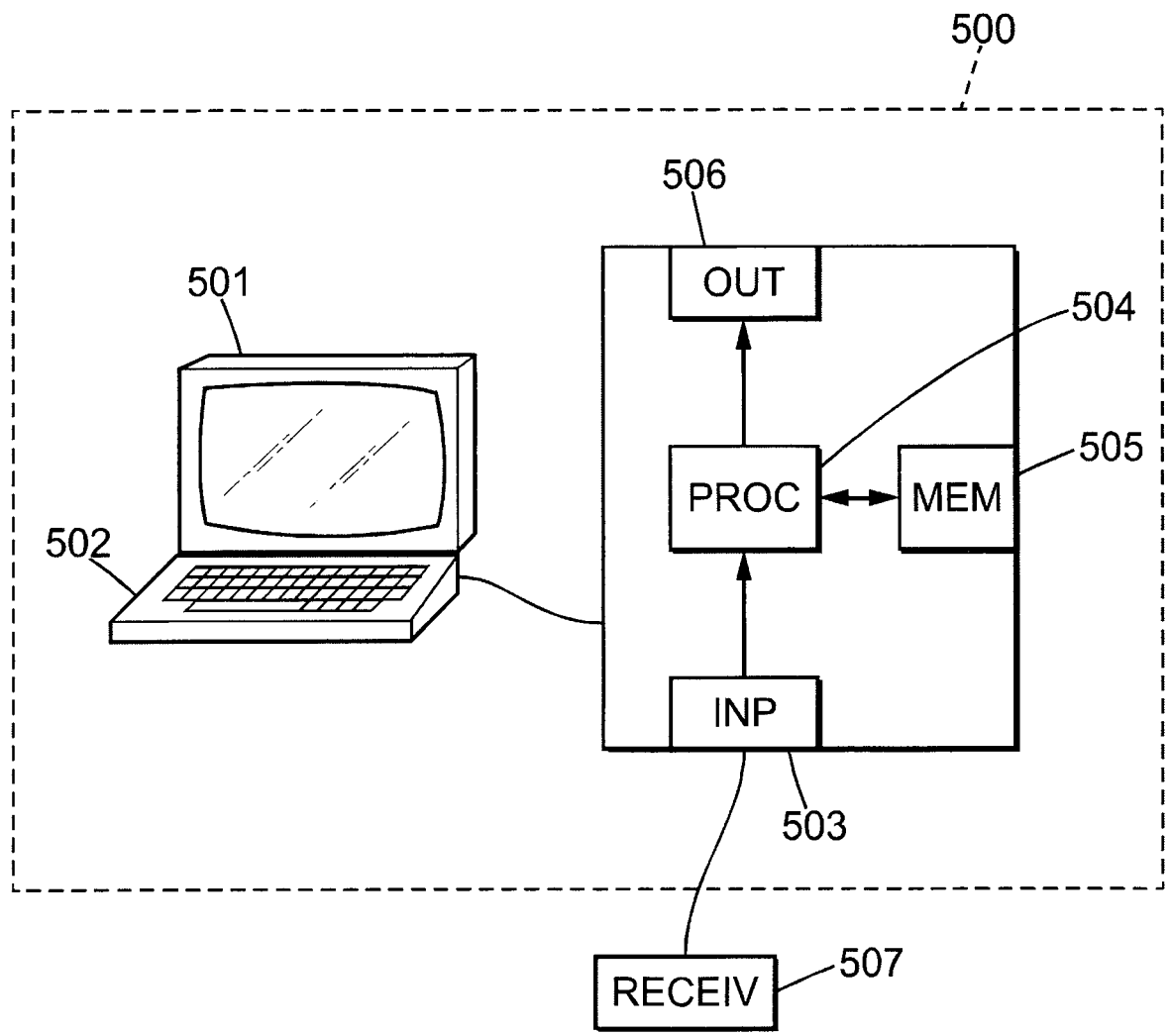
FIG. 5 is a possible embodiment for a device that enables the present invention.

FIG. 5 is a possible embodiment for a device that enables the present invention.

In this embodiment, the device 500 comprise a computer, this computer comprising a memory 505 to store program instructions loadable into a circuit and adapted to cause circuit 504 to carry out the steps of the present invention when the program instructions are run by the circuit 504.

The memory 505 may also store data and useful information for carrying the steps of the present invention as described above.

The circuit 504 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»).

For instance, the device may be comprised in a transmitter, and the computer may comprise an input interface 503 for the reception of channel information, for instance matrices $A_{T,j}^{[l]}$, $A_{R,j}^{[l]}$ and $D_j[l]$ associated to a sparse representation of the channel, for all active users $j \in \mathcal{T}$ of the cell and for all subcarriers $l=1, \ldots, L$, according to one embodiment of the invention and an output interface 506 for providing the MU groups, and the RF precoding and combining matrices.

To ease the interaction with the computer, a screen 601 and a keyboard 602 may be provided and connected to the computer circuit 604.

Furthermore, the flow chart represented in FIG. 3 can represent all or part of the steps of a program which may be executed by a processor located in the transmitter. As such, FIG. 3 may correspond to the flow chart of the general algorithm of a computer program within the meaning of the invention.

The invention claimed is:

1. A hybrid analog/digital method implemented by a computer for enabling analog and digital precoding in a millimeter wave communication system comprising a transmitter being able to serve a plurality of receivers over a plurality of subcarriers, the method comprising:
jointly determining an analog precoding matrix $F_{RF}$ and a plurality of multi-user groups $\mathcal{G}_1$, each multi-user group $\mathcal{G}_l$ being associated to a respective subcarrier l among the plurality of subcarriers, each multi-user group $\mathcal{G}_l$ containing a plurality of receivers among the plurality of receivers to be jointly served for a data transmission on the respective subcarrier l;
for each subcarrier l among the plurality of subcarriers, processing $N_s(l)$ data streams $I_1, \ldots I_{N_s(l)}$ by a digital base band precoder $F_{BB}$ [l];
processing the outputs of the digital base band precoders $F_{BB}$ [l] with transmitting RF chains; and
processing the outputs of the transmitting RF chains using the analog precoding matrix $F_{RF}$ to obtain at least one signal to transmit to at least one receiver among the plurality of receivers on a subcarrier among the plurality of subcarriers;
wherein the joint determination of the analog precoding matrix $F_{RF}$ and the plurality of multi-user groups $\mathcal{G}_l$ comprises:
/a/ optimizing a beamforming function $f(F_{RF}, \mathcal{G}_1, \ldots, \mathcal{G}_L)$ of the analog precoding matrix $F_{RF}$ and the multi-user groups $\mathcal{G}_l$ with respect to the analog precoding matrix $F_{RF}$, the multi-user groups $\mathcal{G}_l$ being fixed;
/b/ optimizing a scheduling function $g(\mathcal{G}_l, F_{RF})$ of the analog precoding matrix $F_{RF}$ and the multi-user groups $\mathcal{G}_l$ with respect to the multi-user groups $\mathcal{G}_l$, a value of the analog precoding matrix $F_{RF}$ being fixed;
wherein /a/ and /b/ are iteratively repeated until a stopping criterion is met.

2. The method of claim 1, wherein /b/ is performed after /a/, wherein in /a/ the multi-user groups $\mathcal{G}_l$ are obtained in a previous iteration of the joint determination, and wherein in /b/ the value of the analog precoding matrix $F_{RF}$ is obtained in a current iteration of /a/.

3. The method of claim 1, wherein /b/ is performed before /a/, wherein in /a/ the multi-user groups $\mathcal{G}_l$ are obtained in a current iteration of /b/, and wherein in /b/ the value of the analog precoding matrix $F_{RF}$ is obtained in a previous iteration of the joint determination.

4. The method of claim 1, wherein the analog precoding is performed by using a set $\mathcal{C}_{prec}$ of analog precoding codewords, wherein /a/ comprises:
determining a first matrix $F^*_{RF}$ that optimizes the beamforming function $f(F_{RF}, \mathcal{G}_1, \ldots, \mathcal{G}_L)$ without supposing that columns of the first matrix $F^*_R$ belong to the set $\mathcal{C}_{prec}$ of analog precoding codewords;
determining at least one analog precoding codewords, each determined analog precoding codeword minimizing a distance to a column of the first matrix $F^*_{RF}$;
determining the analog precoding matrix $F_{RF}$ whose columns are equal to the determined at least one analog precoding codewords.

5. The method of claim 4, further comprising:
receiving a plurality of transmitting matrices $A_{T,\pi(l,k)}^{[l]}$, each transmitting matrix among the plurality of transmitting matrices being associated to a receiver $\pi(l,k)$ among the plurality of receivers and to a subcarrier l among the plurality of subcarriers, wherein columns of each transmitting matrix among the plurality of transmitting matrices belong to the set $\mathcal{C}_{prec}$ of analog precoding codewords;
determining, based on the plurality of transmitting matrices $A_{T\pi(l,k)}^{[l]}$, a plurality of receiver sets $\mathcal{S}_l$, each receiver set $\mathcal{S}_l$ comprising one or more receiver among the plurality of receivers, each receiver among the one or more receiver being associated to a subcarrier among the plurality of subcarriers;

wherein /a/ comprises:
determining a plurality of analog precoding submatrices $F_{RF,k}$, each analog precoding submatrix $F_{RF,k}$ corresponding to a part a the analog precoding matrix $F_{RF}$ associated to receivers of a respective receiver set $\mathcal{S}_k$.

6. The method of claim 5, wherein each transmitting matrix among the plurality of transmitting matrices is an analog precoding codeword and is associated to a respective subcarrier among the plurality of subcarriers and to a respective receiver among the plurality of receivers.

7. The method of claim 6, wherein each transmitting matrix corresponds to a respective significant communication path between the transmitter and the respective receiver on the respective subcarrier.

8. The method of claim 5, wherein the plurality of receiver sets $\mathcal{S}_i$ are determined based on a similarity measure between at least two transmitting matrices among the plurality of transmitting matrices $A_{T,\pi(l,k)}^{[l]}$.

9. The method of claim 1, further comprising determining at least one analog combining matrix $W_{RF,\pi(l,k)}$;
wherein the beamforming function and the scheduling function are further function of the at least one analog combining matrix $W_{RF,\pi(l,k)}$;
wherein the optimization in /a/ is a joint optimization of the beamforming function with respect to the analog precoding matrix $F_{RF}$ and the at least one analog combining matrix $W_{RF,\pi(l,k)}$;
wherein the optimization in /b/ is performed with a value of an analog combining matrix among the at least one analog combining matrix $W_{RF,\pi(l,k)}$ being fixed;
wherein at least one determined analog combining matrix $W_{RF,\pi(l,k)}$ is further used for processing at least one signal to transmit to at least one receiver among the plurality of receivers on a subcarrier among the plurality of subcarriers.

10. The method of claim 9, wherein the analog combining is performed by using a set $\mathcal{C}_{comb,\pi(l,k)}$ of analog combining codewords, wherein /a/ comprises:
determining a second matrix $W^*_{RF,\pi(l,k)}$ that optimizes the beamforming function without supposing that columns of the second matrix $W^*_{RF,\pi(l,k)}$ belong to the set $\mathcal{C}_{comb,\pi(l,k)}$ of analog combining codewords;
determining at least one analog combining codewords, each determined analog combining codeword minimizing a distance to a column of the second matrix $W^*_{RF,\pi(l,k)}$;
determining an analog combining matrix $W_{RF,\pi(l,k)}$ whose columns are equal to the determined at least one analog combining codewords.

11. A transmitter of a millimeter wave communication system enabling analog precoding and analog combining, the transmitter being able to serve a plurality of receivers over a plurality of subcarriers, the transmitter comprising:
a circuit for jointly determine an analog precoding matrix $F_{RF}$ and a plurality of multi-user groups $\mathcal{G}_l$, each multi-user group $\mathcal{G}_l$ being associated to a respective subcarrier l among the plurality of subcarriers, each multi-user group $\mathcal{G}_l$ containing a plurality of receivers among the plurality of receivers to be jointly served for a data transmission on the respective subcarrier l;
at least a circuit for processing, for each subcarrier l among the plurality of subcarriers, $N_s$ (l) data streams $I_1, \ldots, I_{N_s(l)}$ by a digital base band precoder $F_{BB}[l]$; and
processing the outputs of the transmitting Rf chains
a circuit for processing the outputs of the transmitting RF chains, by using the analog precoding matrix $F_{RF}$, to obtain at least one signal to transmit to at least one receiver among the plurality of receivers on a subcarrier among the plurality of subcarriers; and
wherein the circuit for jointly determine the analog precoding matrix $F_{RF}$ and the plurality of multi-user groups $\mathcal{G}_l$, is configured to:
/a/ optimize a beamforming function $f(F_{RF}, \mathcal{G}_1, \ldots, \mathcal{G}_L)$ of the analog precoding matrix $F_{RF}$ and the multi-user groups $\mathcal{G}_l$ with respect to the analog precoding matrix $F_{RF}$, the multi-user groups $\mathcal{G}_l$ being fixed;
/b/ optimize a scheduling function $g(\mathcal{G}_l, F_{RF})$ of the analog precoding matrix $F_{RF}$ and the multi-user groups $\mathcal{G}_l$ with respect to the multi-user groups $\mathcal{G}_l$, a value of the analog precoding matrix $F_{RF}$ being fixed;
iteratively repeat /a/ and /b/ until a stopping criterion is met.

12. A millimeter wave communication system enabling analog precoding and analog combining, the system comprising a transmitter according to claim 11 being able to serve a plurality of receivers over a plurality of subcarriers.

13. A non-transitory computer readable storage medium, having stored thereon a computer program comprising program instructions, the computer program being loadable into a data-processing unit and adapted to cause the data-processing unit to carry out the method of claim 1 when the computer program is run by the data-processing device.

* * * * *